3,262,798
ALUMINOUS CEMENT SLAG COMPOSITION AND METHOD OF INCREASING COMPRESSIVE STRENGTH OF SAME
Charles F. Booth and Brooks M. Whitehurst, Richmond, Va., assignors to Mobil Oil Corporation, a corporation of New York
Filed Oct. 22, 1964, Ser. No. 405,717
12 Claims. (Cl. 106—104)

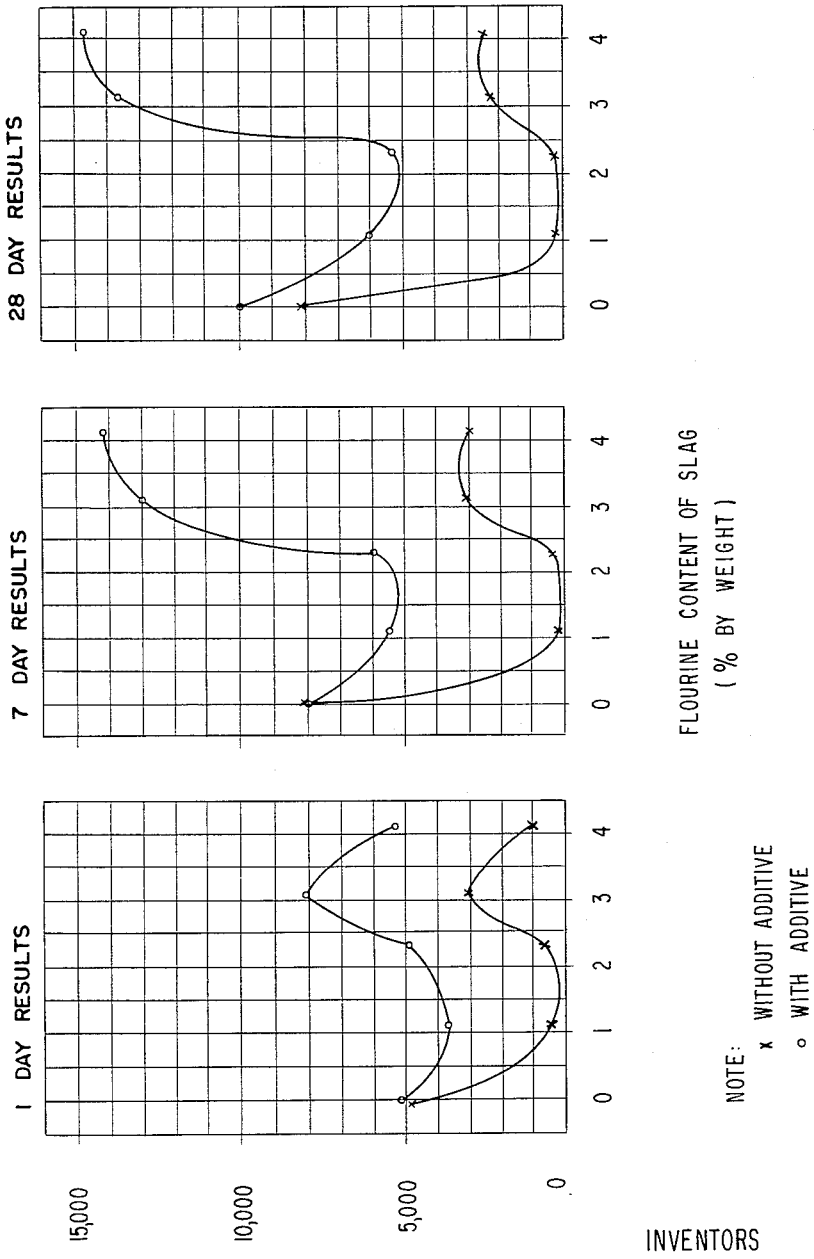

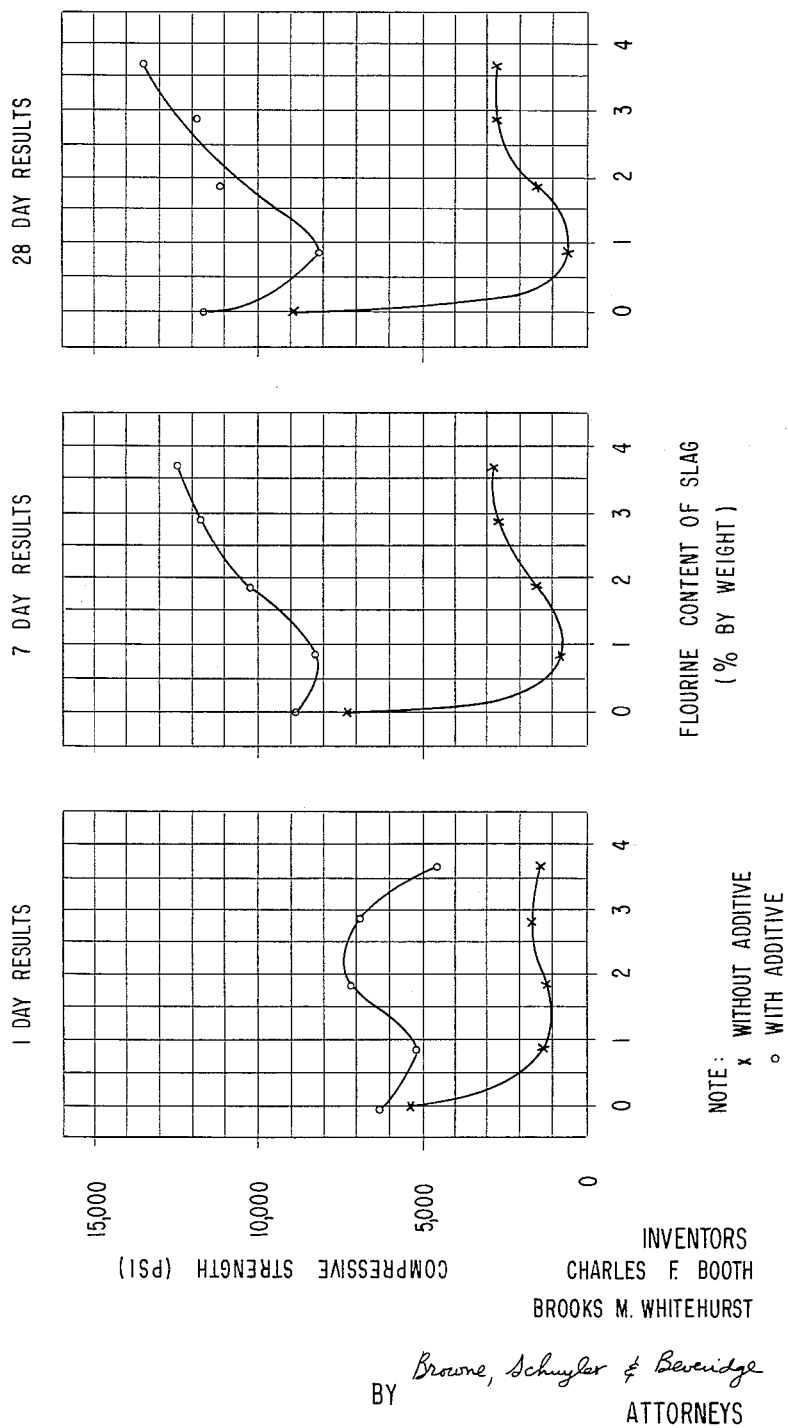

This application is a continuation-in-part of our application Serial No. 736, filed January 6, 1960, now abandoned, which in turn is a continuation-in-part application of our earlier application Serial No. 750,580, filed July 24, 1958, and now abandoned.

This invention relates to calcium aluminate cements, sometimes referred to as alumonius cements, and, more particularly, to the process of forming high-strength cements from phosphate ores having a high fluorine content. This invention also relates to a process for increasing the strength of high fluorine-containing calcium aluminate cements and, in another aspect, relates to a particular additive, per se, which has been found to increase the strength of such cements by a factor of up to about 15.

Calcium aluminate or so-called aluminous cement and methods for its production are well known. Aluminous cement is characterized in that it contains roughly equal amounts of CaO and $Al_2O_3$, e.g., in the neighborhood of 40% of each and a relatively low content of $SiO_2$, e.g., not more than about 12%. The remainder of the cement is constituted by what may be regarded as being impurities such as compounds of alkali metals, F, Fe, Mg, Ti, S, Zr, etc. Aluminous cement is further characterized by its high early strength, as compared to Portland cement, and by other useful properties such as resistance to acids, alkalies, sea water and aqueous solutions of sulfates. Aluminous cement customarily is made by fusing a mixture, in suitable proportions, of an aluminous material such as bauxite and a calcareous material such as lime, either or both of which may contain silica.

It is also well known to make elemental phosphorus by heating a mixture of phosphate rock, a silicious material such as sand, and a carbonaceous material such as coke. This process gives elemental phosphorus and a slag which is predominantly calcium silicate and which is not useful as hydraulic cement.

It has been proposed to carry out the process of making phosphorus referred to above with the substitution of an aluminous material such as bauxite for all or part of the siliceous material, for the purpose of producing elemental phosphorus and a slag product conforming to the requirements for an aluminous cement. However, so far as we have been able to ascertain no one heretofore has been able successfully to operate a commercial electric furnace for the concomitant production of elemental phosphorus and aluminous cement using fluoroapatite phosphate rock containing the customary 2.5% or more of fluorine as the source of the phosphorus.

Attempts have been made to control the composition of the slag produced in the above mentioned process of making phosphorus, particularly the fluorine content. For example it has been proposed to carefully select phosphate ore of low fluorine content and to defluorinate the phosphorus ore, but such processes are commercially unattractive.

Another proposal (see U.S. Patent No. 2,859,124) is to limit the fluorine content to less than 3.5% when the silica content is withn the range from 5% to 14%.

Now we have found that aluminous cement of excellent quality may be made by a commercially attractive procedure, simultaneously with the economical production of phosphorus from normal phosphate rock which contains from more than 2.5% to about 4% of fluorine and without any selection or defluorination of the phosphate rock provided that (a) The compensated slag composition is within the area ABCD of FIG. 2 of the drawings, (b) The fluorine content of the slag is within the range of from more than 2.5% to about 4% and, optionally, of from more than 2.5% to about 4% and, optionally, (c) An additive is mixed with the slag composition before, during, or after grinding.

By cement of excellent quality we mean a cement the compressive strength of which, when tested by standard ASTM procedures, is at least 4500 p.s.i. at the end of 24 hours, at least 8000 p.s.i. at the end of 7 days, and shows a further substantial gain in strength up to 28 days.

By compensated composition we mean the composition of the remainder, with respect to CaO, $Al_2O_3$ and $SiO_2$, after the subtraction from the total slag composition of all other constituents thereof and of the amount of CaO required to combine with such other constituents. For convenience the compensated composition may be regarded as being the cement portion of the total slag composition while the other constituents including the CaO required to combine therewith may be regarded as being the non-cement portion of the total composition.

Referring to the drawings:

FIGS. 3 and 4 are graphs showing the compressive strengths of cements having different fluorine contents with and without the additive referred to above.

It was surprising in view of the prior art to discover that the presence of fluorine in the slag is not necessarily deleterious to the production of aluminous cement. It was even more surprising to discover that its presence is actually advantageous when the compensated slag composition is within the specified area ABCD and is supplemented by the addition of a suitable additive either before, during, or after grinding.

The use of additives to control the strength characteristics of aluminous cements containing fluorine is believed to be new. The prior art discloses the use of certain additives in fluorine-free aluminous cements for the control of setting times and hardening rates. However, the inclusion of these prior art additives does not significantly improve the ultimate strength properties of fluorine-free aluminous cements. Further, the use of these prior art additives alone in aluminous cements containing fluorine will not yield the high strength properties obtained through the practice of our invention. Our invention comprises the use first, of properly compensated raw material composition (to give a slag with the cement portion lying within area ABCD of FIGURE 2) and second the judicious use of additives to increase the strength of the cement.

It is known from the prior art that the setting and hardening characteristics of fluorine-free cements may be controlled by the rate at which the molten slag is cooled. It is known that fluorine when contained in molten cement slags has the ability to promote crystallization of the slag. One obvious method for dealing with the effect of high fluorine is an exacting and costly method of controlled slag cooling. For large-scale operations such cooling is very expensive, time-consuming and bulky. The practice of our invention, which employs first a compensated slag composition and the use of an additive, eliminates any requirements for elaborate and expensive cooling.

In accordance with our invention the slag is simply cooled by exposure to the surrounding atmosphere in either small or large batches without the exercise of any precautions to promote either fast or slow cooling. The molten slag may, however, if desired be cooled quickly as by quenching it in or with water. The relative independence of our cement from any particular method of cooling the molten slag is attributed to the fluorine content of at least more than 2.5%.

Figure 1:
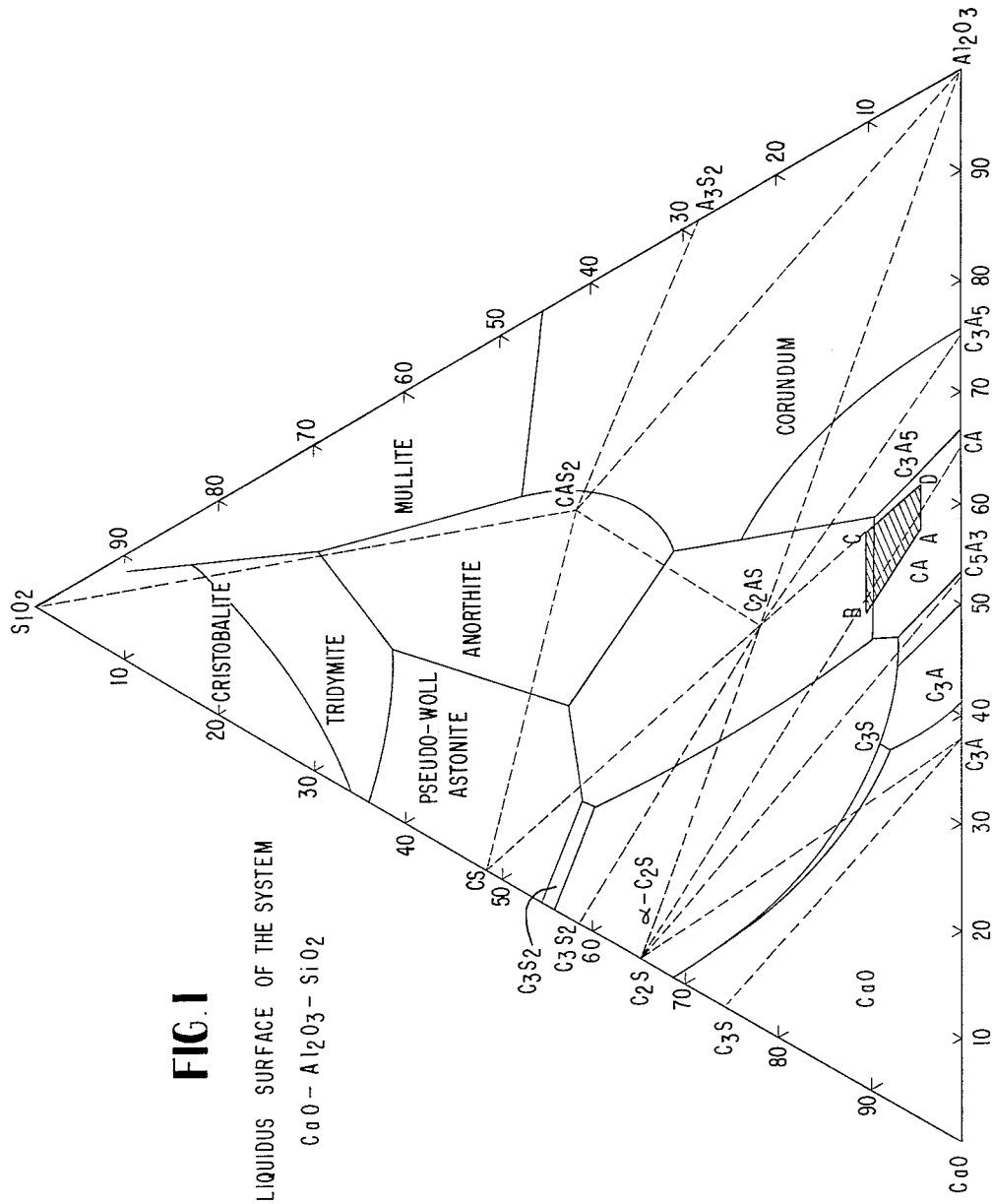
FIG. 1 is a graph showing the liquidus surface of the system $CaO-Al_2O_3-SiO_2$ and the compensated cement composition area ABCD referred to above.
Figure 2:
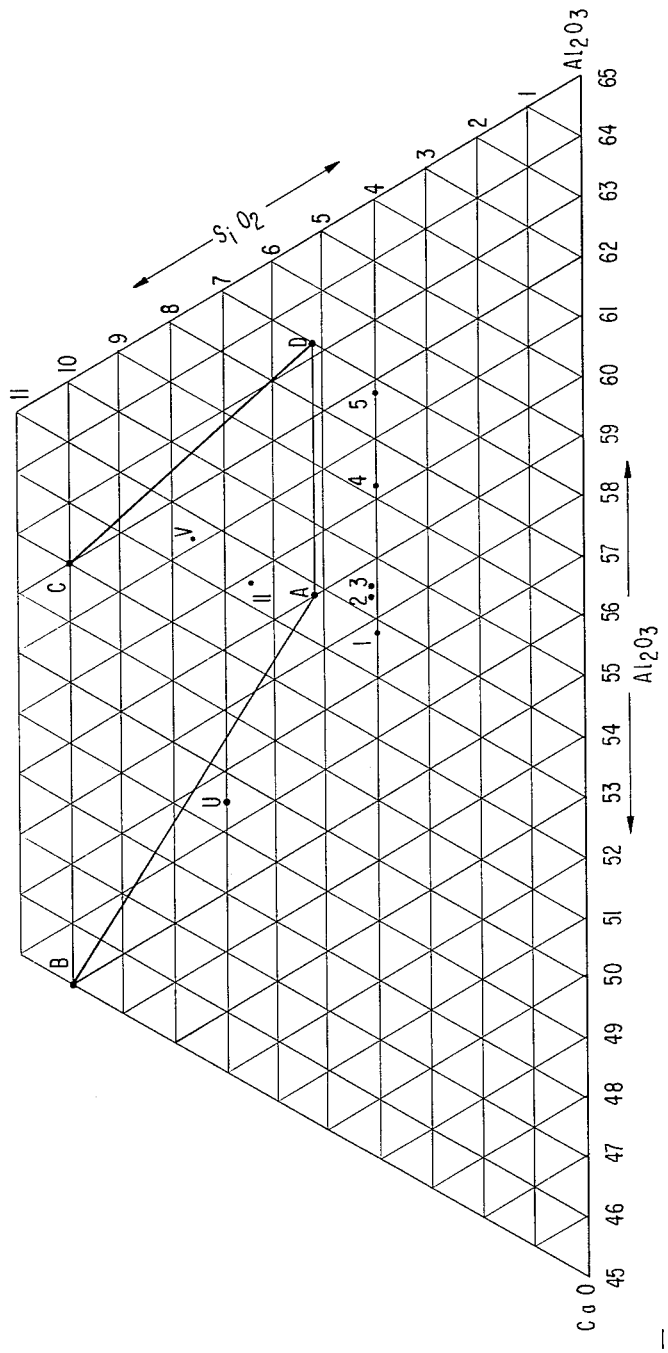
FIG. 2 is a graph on a larger scale of the area ABCD.

Referring to the drawings, particularly FIGS. 1 and 2, it will be seen that the composition of the compensated slag may vary within the ranges defined by the areas ABCD. The fluorine content of the total slag (not compensated) may vary within the range of from more than 2.5 to about 4%. The other usual constituents of the slag such as alkali metals, Fe, P, Mg. Ti, S and Zr may vary within rather wide ranges and ordinarily are not present in amounts that are harmful or that require any special selection of the raw materials. One might of course encounter a phosphate rock or ore or an aluminous material such as bauxite containing such a large amount of one or more impurities that it might be unusable or disadvantageous but when using Florida phosphate rock which is suitable for use for the production of phosphorus and bauxite is characterized by a high $Al_2O_3$ content i.e. 90% or more one would not ordinarily encounter a prohibitive amount of impurities. By impurities we means all components of the total slag composition other than $Al_2O_3$, CaO and $SiO_2$. To be more precise we may say that the total of the impurities in the slag composition including F and $P_2O_5$ and the amount of CaO which is calculated to be chemically equivalent to the impurities should not exceed about 20%. In other words the compensated slag composition should amount to at least about 80% of the total (uncompensated) slag composition. There is no minimum requirement as to the impurities excepting fluorine which as stated must be within the range of from more than 2.5 to 4%. The other impurities may be zero.

It would be undesirable to have 20% of impurities in the total slag composition all in the form of one impurity. For instance $TiO_2$ should not exceed 3.5%. $P_2O_5$ will not exceed about 3% as a result of an economical process for the production of phosphorus but disregarding economical phosphorus recovery from the ore of the $P_2O_5$ may go as high as 7%. MgO should not exceed about 2% and usually only a mere trace is present.

Other of the impurities mentioned, such as Fe, S, and Zr, generally are present in small amounts.

As appears from the foregoing disclosure there is no direct critical relationship as between F and $SiO_2$ in the slag, i.e. $SiO_2$ may vary independently from more than 5% to about 10% while F varies independently from more than 2.5% to about 4%.

In carrying out our invention, we first select a supply of phosphate rock, bauxite and coke, the individual components of which may have the following typical analyses:

| | Phosphate Rock, Percent | Bauxite, Percent | Coke, Percent |
|---|---|---|---|
| $P_2O_5$ | 36.40 | | |
| CaO | 50.50 | | |
| $Al_2O_3+TiO_2$ | 0.77 | 93.17 | |
| $SiO_2$ | 4.20 | 5.33 | 2.48 |
| $Fe_2O_3$ | 0.68 | 1.22 | |
| F | 3.49 | | |
| $CO_2$ | 2.40 | | |
| $H_2O$ | 0.40 | 1.00 | 0.60 |
| Fixed Carbon | 0 | | 88.50 |

When these raw materials are combined in proportions of 100 parts of phosphate rock, 64 parts of bauxite and 19 parts of coke, and reduced in an electric furnace to remove the phosphorus, in the manner more specifically set forth in the examples, infra, there is obtained a slag having the following compositions:

| Component | Percent Analyzed | $CaO \cdot Al_2O_3 \cdot SiO_2$ 100% Basis |
|---|---|---|
| CaO | 40.50 | 43.56 |
| $Al_2O_3$ | 46.00 | 49.47 |
| $SiO_2$ | 6.48 | 6.97 |
| $P_2O_5$ | 1.50 | |
| F | 2.50 | |
| $TiO_2$ | 2.00 | |
| Other impurities | 1.02 | |

This composition of the slag exhibits lime, alumina and silica contents which, when reduced to a 100% basis, lies outside and to the left of the area ABCD of FIGURE 1 (see point U of FIGURE 2). This reduction to a 100% basis is necessary because the gross values for lime, alumina and silica as analyzed are not coincidental, and it is accomplished by adding together the analyzed values of these components and calculating the percentage of the total contributed by each component. The point thus determined (point U of FIGURE 2) shows that the crystalline phases $5CaO \cdot 3Al_2O_3$, $CaO \cdot Al_2O_3$ and $2CaO \cdot SiO_2$ should be present in the fully crystallized slag. However, upon X-ray examination of a slag of this gross analysis, we actually found $CaO \cdot Al_2O_3$ and gehlenite, which showed that the gross composition would not indicate the true phase composition.

Therefore, to find the actual phase composition, it is necessary to compensate for the lime-requiring impurities $P_2O_5$, F and $TiO_2$. This is done by determining the amount of lime equivalent to $P_2O_5$ as $(Ca_3(PO_4)_2)$, to fluorine (as $CaF_2$) and to $TiO_2$ (as $CaO \cdot TiO_2$). The total lime equivalent to these impurities is subtracted from the gross CaO as reported in the slag analysis. The remainder of CaO is available to form cement compounds. When the remaining lime and the alumina and silica are corrected to a 100% basis, the compensated composition is obtained, i.e. 38.9% CaO, 53.6% $Al_2O_3$ and 7.5% silica. When this compensated product is plotted (point V of FIGURE 2), it is seen that the actual crystalline phases present in the slag are calcium aluminate and gehlenite, which is proved by X-ray analysis, and probably dicalcium silicate. The third stated phase was not found. This may be due to the apparent ability of fluorine to prohibit its formation, or due to its being present to the extent of less than 10% of the slag, or to its presence in a form which cannot be detected by X-rays.

This compensation is not merely a mathematical manipulation, but is based on the proven fact that the above mentioned impurities do require lime. This lime must be taken into account when formulating the charge to yield a specific compensated slag composition. The first step in formulating the charge is to pick a three component composition (lime, alumina and silica) from the phase diagram in the desired area ABCD. Knowing the raw materials to be used, experience has taught us approximately what the residual amounts of non-cement forming impurities will be in the final slag. Thus, it is possible to calculate (as hereinbefore stated) the amount of lime tied up as $CaF_2$, $CaO \cdot TiO_2$ and $Ca_3(PO_4)_2$ and therefore to adjust the starting $Al_2O_3/CaO$ in order to compensate for the lime lost to these impurities.

It is noted that in the foregoing discussion we have referred to CaO compensation with respect to only F, $TiO_2$, and $P_2O_5$. The other impurities generally are present in such small amounts that they may be disregarded. However, if any of the other lime-requiring impurity is present in substantial amount compensation therefor should be made.

Chemical compensation shows that, as the impurities in the slag, especially fluorine, increase, the amount of alumina required to give a cement falling within the defined area ABCD decreases. It is also this consideration which allows the use of a wider range of fluorine concentration than previously thought possible. One can also predict from the starting materials where the composition of the cement component of the slag will lie on the phase diagram so that a consistent, reproducible product can be obtained.

Failure to take into account the lime requiring characteristics of these impurities is a direct cause of results which have heretofore indicated that a useful cement cannot be made with a fluorine content above 2.5%. We consider the discovery of this method of compensating the composition an essential feature of our invention insofar as it allows the use of a higher concentration of fluorine and other lime requiring impurities.

We have found a variety of materials to be suitable for use as additives which give vastly improved strength properties to the aluminous cements of this invention and also to aluminous cements of the prior art. It is not definitely known how the additives function but we offer the theory that they tend to retard the dissolution of or to lower the reactivity of the CaO components of the cement when it is wetted with water. It therefore appears that the additive may react with the CaO or act as a calcium sequestering agent or to lower the solubility of the CaO or that it may exert a dispersing action or lower the pH of the aqueous medium in the wetted cement. It appears that some additives may function in one way and other additives in another way, all giving the same end result, i.e. a retardation of the CaO in the setting of the cement. It has been observed for instance that the additive not only increases the strength of the set cement but also that it reduces the quantity of water required in making a mortar of the cement. Further, it has been observed that whereas the amount of water required generally increases with the fluorine content of the cement, this effect is not observed in the presence of the additive. Therefore the additive may exert some action such as those suggested above with respect to the fluorine content of the cement or the action may be with respect to both the CaO and the F contents of the cement.

The additives which we have found to be effective include many sugars; for example, sucrose; several water-soluble inorganic salts and particularly those which tend to lower the pH of the aqueous medium, such as $MgSO_4 \cdot 7H_2O$; sequestering agents such as sodium metaphosphate; dispersing agents such as calcium lignin sulfonate; and chelating agents such as tetrasodium tetrine.

A preferred additive to aluminous cement is a mixture of lime and sugar in a ratio of from 1:1 to 6:1 by weight. While the mixture can be ground to the size for the desired cement, the very fine particles of sugar become hygroscopic and, unless a carrier is added to the lime-sugar mixture soon after grinding, water picked up by the sugar tends to prevent an even distribution throughout the cement. Accordingly, the amount of carrier for the lime-sugar mixture should be sufficient to prevent the sugar from picking up water, but not enough to have a deleterious effect on the cement. Carriers suitable for purposes of this invention are those of non-porous, non-hydratable materials which do not adversely affect the properties of the cement, and include silica, mullite, granite, bauxite, and the like. The amount of additive, including the carrier for the aforesaid sugar-lime mixture, is from about 1.5 to about 3% by weight of the aluminous cement slag composition.

To impart the improved high-strength properties to the aluminous cement, the sugar should be present in the final cement in amounts of from about 0.1% to about 0.3% by weight of the cement, with excellent results being achieved when the amount of sugar is within the range of 0.13 to 0.17%. About 0.15% sugar in the cement is usually preferred.

To an aluminous cement slag composition having the following analyzed components by weight—

| Ingredient: | Slag analysis, percent |
|---|---|
| CaO | 38.29 |
| $Al_2O_3$ | 47.19 |
| $SiO_2$ | 5.57 |
| $P_2O_5$ | 2.50 |
| F | 2.43 |
| $Fe_2O_3$ | 0.51 |
| Insol. | 1.06 |
| $Al_2O_3/CaO$ | 1.23 | was uniformly mixed the additives set forth in the following table and the various cements formed therefrom were tested for compressive strengths at the end of 1, 3, 7, and 28 days.

| Weight Lime,[1] gm. | Weight Sugar, gm. | Lime to Sugar Ratio | Carrier | Weight Carrier, gm. | Strength, p.s.i., Days | | | |
|---|---|---|---|---|---|---|---|---|
| | | | | | 1 | 3 | 7 | 28 |
| 158 | 50 | 3:1 | $SiO_2$ | 450 | 6,192 | 8,058 | 9,033 | 9,375 |
| 632 | 150 | 4:1 | $SiO_2$ [2] | 1,200 | 5,567 | 6,308 | 7,258 | 8,433 |
| 158 | 50 | 3:1 | $Al_2O_3$ | 442 | 6,700 | 9,008 | 9,458 | 11,033 |

[1] 95% $Ca(OH)_2$.
[2] RASC Bauxite.

Enough of each additive composition was used to give a final concentration of sugar in the cement of about 0.154% by weight, i.e., about 2% by weight of the total additive.

A preferred lime-sugar additive is a mixture of sugar, hydrated lime and powdered silica preferably in the proportions of 7.7% sucrose, 15.4% $Ca(OH)_2$ and 76.9% $SiO_2$. This composition is preferred because sucrose alone is quite critical and the amount thereof which may be added to a particular cement must be controlled within quite narrow limits whereas the lime appears to moderate the effect of the sugar and to make the amount thereof that may be used less critical. Although lime or hydrated lime may be used with sugar it is not an effective additive alone, due to the tendency of the sugar, after the material is ground, to absorb water from the air. The silica component of the above described additive composition is inert and acts merely as a carrier or diluent for the sugar.

The calcium lignin sulfonate advantageously is used in admixture with sodium carbonate although sodium carbonate is not suitable for use alone.

We have found that the effective range of the active ingredient or ingredients of the above additives is from 0.04% to 1.5% by weight of the ground slag. However, it is not known precisely how the additive functions and therefore there is no presently known method of predetermining the exact concentration of additive necessary to give the strength properties desired, except by trial and error. The best criterion for determining the most effective concentration of additive is to find by tests, the amounts which will on the lower side give a cement which will stiffen too quickly and on the upper side will be too thin, in both cases when the water-cement ratio ($W/C$) is about 0.5 or less. It is then possible to determine the quantity of additive between these limits which will give a cement of the desired workability and strength.

The following specific examples will serve to illustrate our invention. They present the best mode that we have found up to the present time, and the invention is not to be limited thereby. It is to be understood that the invention embraces any equivalent method of arriving at the compositions stated and the use of any additive among the broad classes thereof disclosed which will give the desired strength properties.

EXAMPLE 1

A cement was prepared in a phosphorus reduction furnace by the continuous feeding of naturally occurring, fluorine-containing raw materials. The burden composition consisted of 100 parts of Florida phosphate rock, 64 parts of bauxite and 19.25 parts of coke, each having the typical analysis as shown hereinbefore. This composition was pre-selected so that the compensated composition of the cement portion of the slag after smelting (exclusive of the CaO equivalent of fluorine, titania ($TiO_2$) and $P_2O_5$), would have a compensated alumina to lime ratio of 1.34 and would lie inside of the defined ABCD area of the phase diagram. The molten slag thus formed was tapped at regular intervals and cooled in carbon crucibles to give pigs of 50 to 135 pounds, with no attention being paid to the rate of cooling of the slag in air. The slag cooled from about 1600° C. to room temperature in about 4 hours. The slag contained by gross analysis CaO, 42.38 percent; $Al_2O_3$, 48.26 percent; $SiO_2$, 5.80 percent; fluorine, 2.51 percent; $P_2O_5$, 1.08 percent, and $Fe_2O_3$, 0.28 percent.

The slag was ground to a standard fineness, i.e. about 3000 cm.$^2$ per gram as determined by the Blaine air-permeability test. Cements containing no additive and 2% by weight of an additive mixture consisting of 7.7 percent sucrose, 15.4 percent $Ca(OH)_2$ and 76.9% silicia were prepared and tested according to a standard ASTM procedure (ASTM C-109). The strengths of the cements with and without additive are summarized in the following table.

|  | Compressive Strength, p.s.i. | | | |
| --- | --- | --- | --- | --- |
|  | 1 day | 3 days | 7 days | 28 days |
| Without Additive | 1,845 | 2,847 | 2,232 |  |
| With Additive | 5,692 | 10,008 | 10,800 | 11,017 |

Point 11 of FIGURE 2 shows the compensated composition of this slag.

EXAMPLE 2

A cement was prepared by pre-selecting a composition that would yield an alumina to lime ratio which, after compensating the gross composition for F, $TiO_2$, $P_2O_5$ and their CaO equivalents to $CaF_2$, $CaO \cdot TiO_2$ and $Ca_3(PO_4)_2$ would be within area ABCD. The burden consisted of 100.00 parts Florida hard rock phosphate (containing 38.81% $P_2O_5$, 49.57% CaO, 5.27% $SiO_2$, 3.66% F, 0.73% $Al_2O_3+TiO_2$, 0.52% $Fe_2O_3$, 2.44% $CO_2$ and 0.39% moisture), 60.90 parts Surinam bauxite (containing 94.16% $Al_2O_3+TiO_2$, 3.97% $SiO_2$ and 1.20% $Fe_2O_3$) and 18.81 parts coke (containing 86.00% fixed C, 5.32% $SiO_2$, 3.37% $Al_2O_3+TiO_2$, 0.75% CaO and 1.48% $Fe_2O_3$). The slag formed after reduction of the phosphate to elemental phosphorus in an electric furnace contained by gross chemical analysis 42.10% CaO, 45.84%

$$Al_2O_3+TiO_2$$

6.24% $SiO_2$, 1.73% $P_2O_5$, 2.76% F, and 1.55% $Fe_2O_3$. The slag was ground to a fineness of about 3000 cm.$^2$/gm. (Blaine air-permeability test) and tested with and without the same additive used in Example 1. Results of compressive strength tests (ASTM Test C-109) are summarized in the following table.

|  | Compressive strength, p.s.i. | | | |
| --- | --- | --- | --- | --- |
|  | 1 day | 3 days | 7 days | 28 days |
| Without Additive | 1,385 | 1,924 | 1,924 |  |
| With Additive | 6,583 | 8,667 | 8,800 | 10,338 |

EXAMPLE 3

Cements were prepared by combining and fusing Demarara bauxite (containing about 5.3% silica), technical grade lime and, where needed, calcium fluoride. A gross weight ratio of alumina to lime (inclusive of the CaO equivalent to $CaF_2$) of 1.22 was chosen. The fluorine content of the slag was varied from 0% to about 4%. The corrected silica varied from 3.9 to 4.6%. Each fused charge was subsequently cooled from 1600° C. to 1000° C. in 45 minutes and from 1000° C. to 400° C. in 200 minutes. The resulting slag was ground to a standard fineness and the cements therefrom were tested with and without an additive according to ASTM Procedure C-109. Additive consisted of a ground sugar-lime-silica mixture containing 7.7% sucrose, 15.4% $Ca(OH)_2$ and 76.9% silica. Amount used was based on weight of ground slag. The results are shown in the following table.

| | Slag | | | | Compressive Strength, p.s.i. | | |
| --- | --- | --- | --- | --- | --- | --- | --- |
| No. | $Al_2O_3$/CaO ratio | | Percent F. | Additive | 1 day | 7 days | 28 days |
|  | Gross | Compensated | | | | | |
| 1 | 1.23 | 1.27 | 0 | None | 4,800 | 8,150 | 8,150 |
| 2 | 1.22 | 1.30 | 1.1 | do | 550 | 175 | 150 |
| 3 | 1.17 | 1.31 | 2.3 | do | 688 | 288 | 250 |
| 4 | 1.22 | 1.41 | 3.1 | do | 3,125 | 3,113 | 2,250 |
| 5 | 1.24 | 1.51 | 4.1 | do | 1,000 | 2,925 | 2,425 |
| 1 | 1.23 | 1.27 | 0 | 2% | 5,125 | 8,038 | 10,000 |
| 2 | 1.22 | 1.30 | 1.1 | 2% | 3,700 | 5,450 | 6,050 |
| 3 | 1.17 | 1.31 | 2.3 | 2% | 4,888 | 6,013 | 5,250 |
| 4 | 1.22 | 1.41 | 3.1 | 2% | 8,000 | 13,000 | 13,600 |
| 5 | 1.24 | 1.51 | 4.1 | 2% | 5,275 | 14,100 | 14,600 |

The dramatic improvement of the fluorine containing cements having the additives therein is readily evident from the above table. Note that the presence of the additive in the control cements (containing no fluorine) did not appreciably affect the final strengths of the cements. The results set forth above are certainly unexpected in that one would suppose that the same additives would perform the same way and that if the cements also contained fluorine, the final strengths of the cements would be poorer than those cements containing no fluorine. Such is not the case. Comparative strength properties are set forth in FIG. 3 of the drawing.

EXAMPLE 4

The slags were prepared and tested as in Example 3, except that the components were combined in such a way that the slag would have a compensated alumina to lime ratio of 1.34 and a corrected silica of about 7.0%. These cements were tested and the results are shown in the following table. The additive was the same as that in Example 3.

| Slag | | | | | Compressive Strength, p.s.i. | | |
|---|---|---|---|---|---|---|---|
| No. | Al₂O₃/CaO ratio | | Percent F. | Additive | 1 day | 7 days | 28 days |
| | Gross | Compensated | | | | | |
| 6 | 1.30 | 1.34 | 0 | None | 5,225 | 7,250 | 9,050 |
| 7 | 1.25 | 1.34 | 0.9 | ---do | 1,175 | 650 | 550 |
| 8 | 1.21 | 1.34 | 1.9 | ---do | 1,100 | 1,538 | 1,568 |
| 9 | 1.18 | 1.36 | 2.9 | ---do | 1,650 | 2,625 | 2,775 |
| 10 | 1.16 | 1.38 | 3.7 | ---do | 1,288 | 2,850 | 2,725 |
| 6 | 1.30 | 1.34 | 0 | 2% | 6,238 | 8,850 | 11,650 |
| 7 | 1.25 | 1.34 | 0.9 | 2% | 5,175 | 8,250 | 8,150 |
| 8 | 1.21 | 1.34 | 1.9 | 2% | 7,188 | 10,250 | 11,150 |
| 9 | 1.18 | 1.36 | 2.9 | 2% | 5,938 | 11,750 | 11,875 |
| 10 | 1.16 | 1.38 | 3.7 | 2% | 4,475 | 12,450 | 13,500 |

As before, an excellent cement containing no fluorine or additive is obtained. It has been reported that the strengths of cements decrease when they contain more than 2% fluorine. Therefore, it was surprising to find that the strengths of the cements containing over 2% fluorine actually exceeded the strength of the same cement containing 0% fluorine. It is also apparent that the use of our additive compositions increases the strengths of fluorine-containing cements by a factor of from about 4 to about 15. FIG. 4 of the drawing sets forth comparative data regarding strengths.

EXAMPLE 4

To an aluminous cement slag composition, which upon analysis showed that it had the following components present, based upon its weight Ingredient: Percent by weight
CaO _____ 39.77
Al₂O₃ _____ 46.46
SiO₂ _____ 6.94
P₂O₅ _____ 1.25
F₂ _____ 2.57
Fe₂O₃ _____ 0.68
Insolubles _____ 1.34 was added, after the slag had cooled and been ground to a particle size suitable for a cement, water having dissolved therein sugar in the amount of .1% by weight of the ground slag. The water and cement composition were thoroughly mixed to insure a substantially uniform distribution of the sugar throughout the composition, and compressive strengths of the cement were measured. The results were as follows:

| | Compressive strength, p.s.i. | |
|---|---|---|
| | 1 day | 3 days |
| Without Additive | 2,076 | 2,595 |
| With Additive | 4,239 | 5,540 |

The results of tests made with other additives, using a cement having a compensated composition within the area ABCD are shown in the following table:

| Additive Compound | Compressive Strength, p.s.i. | | | |
|---|---|---|---|---|
| | 1 day | 3 days | 5 days | 7 days |
| None | 1,298 | | 2,076 | |
| Calcium lignin sulfonate plus Na₂CO₃ | 5,350 | | 6,575 | |
| None | 2,160 | | | |
| Sodium Metaphosphate | 5,536 | 6,450 | | |

Cements 1, 2 and 3 shown in this table are all cements the compensated compositions of which fall within the area ABCD.

| Test | | Additive | Compressive Strength, p.s.i. | | |
|---|---|---|---|---|---|
| | | | 1 day | 3 days | 7 days |
| 1 | Cement #1 | None | 1,298 | 2,076 | |
| 2 | ---do | Calcium lignin sulfonate plus Na₂CO₃ | 5,350 | 6,575 | 7,750 |
| 3 | Cement #2 | None | 2,160 | | |
| 4 | ---do | Sodium metaphosphate | 5,536 | 6,450 | |
| 5 | Cement #3 | None | 1,077 | 2,308 | 2,693 |
| 6 | ---do | MgSO₄·7H₂O | 2,462 | 5,387 | 5,848 |
| 7 | ---do | Sucrose | 3,232 | 6,387 | 6,002 |
| 8 | ---do | Sucrose plus CaSO₄·2H₂O | 3,694 | 6,155 | 7,079 |
| 9 | ---do | Gypsum | 3,078 | 6,233 | 6,079 |
| 10 | ---do | Sucrose plus Ca(OH)₂ plus silica | 6,313 | 8,750 | 9,613 |
| 11 | ---do | Sucrose plus Ca(OH)₂ | 5,575 | 8,950 | 10,338 |
| 12 | ---do | Sucrose plus Ca(OH)₂ plus calcium silicate slag | 6,863 | 8,975 | 9,925 |
| 13 | ---do | Tetra sodium tetrine | 4,540 | 6,618 | 7,387 |
| 14 | ---do | Borax | 2,308 | 6,926 | 7,310 |

Referring to the foregoing table, we note that the CaSO₄·2H₂O used in test 8 was the by-product of the manufacture of triple superphosphate and is slightly acidic, the calcium silicate slag used in test 12 was a slag from a phosphorus furnace and consisted principally of 3CaO·2SiO₂ and CaO·SiO₂ and the tetra sodium tetrine of test 13 is the sodium salt of ethylenediamine tetraacetic acid.

As shown by the test in Example 4, after one day the aluminous cement containing the additive had a compressive strength of 4239 p.s.i. while that without the additive had a compressive strength of only 2076 p.s.i. Thus, the additive increased the compressive strength of the aluminous cement by a factor of about 2 after one day. Tests 5 and 6 in the foregoing table illustrate that the additive, in this case MgSO₄·7H₂O, increased the compressive strength of the aluminous cement, after one day, from 1077 p.s.i. to 2462 p.s.i., again by a factor of about 2. Therefore, in accordance with this invention, the additive can be present in an amount sufficient to increase the compressive strength of the aluminous cement by a factor of from about 2 up to 15.

As stated above, it is not known precisely how these additives function. Some such as $MgSO_4 \cdot 7H_2O$ lower than the pH, some such as sucrose are calcium sequestering agents, some such as $Ca(OH)_2$ have an accelerating action and the tetrasodium tetrine is a chelating agent.

Since our process allows the use of a broader range of fluorine concentration and eliminates the necessity for any defluorination procedure, almost any known naturally occurring phosphate ore which is sufficiently low in silica may be employed as raw material. In this respect, it is commercially advantageous to use a phosphate ore containing as much fluorine as possible, because the lime requiring characteristic of the fluorine allows the use of less alumina or bauxite in the furnace burden to give a cement product of the same quality. At the same time, the melting point of the furnaceable mineral mixture is lowered thereby reducing the heat losses, and giving lower cost operation.

What is claimed is:

1. An aluminous cement slag composition consisting of a cement portion and a non-cement portion, said cement portion being at least 80% of said composition, said composition having a fluorine content of from more than 2.5% to about 4% by weight, said cement portion having a $CaO\text{-}Al_2O_3\text{-}SiO_2$ ratio, based upon 100% weight, coming within the area ABCD of FIG. 2 of the drawing, said composition containing an amount of an additive sufficient to increase the compressive strength of the aluminous cement formed from said slag composition by a factor of about 2 up to 15, said additive being selected from the group consisting of sugar, sodium metaphosphate, $MgSO_4 \cdot 7H_2O$, calcium lignin sulfonate and tetrasodium tetrine.

2. The aluminous cement composition as defined in claim 1 wherein the additive is sugar and is present in amount of from about 0.1% to about 0.3% by weight of said composition.

3. The aluminous cement slag composition as defined in claim 1 wherein said additive is sugar and is present in an additive mixture uniformly admixed with said composition, said additive mixture consisting essentially of from 1:1 to 6:1 $Ca(OH)_2$ to sugar, by weight, in an inert carrier, said additive mixture being present in an amount sufficient to provide from about 0.1% to about 0.3% by weight of sugar to said composition.

4. The aluminous cement composition as defined in claim 1 wherein said additive is sugar and is present in an additive mixture uniformly admixed with said composition, said additive mixture being about 1.5–3% by weight of said composition, said mixture being about 7.7% sucrose, 15.4% $Ca(OH)_2$ and 76.9% $SiO_2$, said mixture increasing by a factor of from 4 to 15 the compressive strength of the aluminous cement formed from said slag composition.

5. The aluminous cement composition as defined in claim 1 containing, as said additive, an amount of sodium metaphosphate sufficient to increase the compressive strength of the aluminous cement by a factor of from 4 to 15.

6. The aluminous cement composition as defined in claim 1 containing, as said additive, an amount of $MgSO_4 \cdot 7H_2O$ sufficient to increase the compressive strength of the aluminous cement by a factor of from 4 to 15.

7. The aluminous cement composition as defined in claim 1 containing, as said additive, an amount of calcium lignin sulfonate sufficient to increase the compressive strength of the aluminous cement by a factor of from 4 to 15.

8. The aluminous cement composition as defined in claim 1 containing, as said additive, an amount of tetrasodium tetrine sufficient to increase the compressive strength of the aluminous cement by a factor of from 4 to 15.

9. A method of increasing the compressive strength of a hydraulic cement formed from an an aluminous slag composition consisting of a cement portion and a non-cement portion, said cement portion being at least 80% of said composition, said composition having a fluorine content of from more than 2.5% to about 4% by weight, said cement portion having a $CaO\text{-}Al_2O_3\text{-}SiO_2$ ratio, based upon 100% weight, coming within the area of ABCD of FIG. 2 of the drawing, comprising incorporating in said composition an amount of an additive sufficient to counteract the retarding effect of the fluorine on the setting time and strength properties of the cement and to increase the compressive strength of said hydraulic cement by a factor of about 2 up to 15, said additive being selected from the group consisting of sugar, sodium metaphosphate, $MgSO_4 \cdot 7H_2O$, calcium lignin sulfonate and tetrasodium tetrine.

10. The method as defined in claim 9 wherein said additive is present in an amount sufficient to increase the compressive strength of said hydraulic cement by a factor of from 4 to 15.

11. The method as defined in claim 10 wherein said additive is sugar.

12. The method as defined in claim 10 wherein said additive is sugar and is present in admixture with $Ca(OH)_2$ in an inert carrier, the ratio of said $Ca(OH)_2$ to said sugar being from 1:1 to 6:1 by weight, said composition containing from 0.1 to 0.3% sugar by weight.

References Cited by the Examiner

UNITED STATES PATENTS

| 1,656,984 | 1/1928 | McCormick et al. | 106—104 |
| 2,099,176 | 11/1937 | Scripture | 106—104 |
| 2,391,493 | 12/1945 | Wainer et al. | 106—104 |
| 2,418,431 | 4/1947 | Scripture | 106—92 |
| 2,859,124 | 11/1958 | King | 106—104 |

FOREIGN PATENTS

| 233,907 | 5/1925 | Great Britain. |

OTHER REFERENCES

Eckel: Cements, Limes and Plasters, John Wiley and Sons, New York City (1927), pages 531, 533, 535.

Lea and Desch: The Chemistry of Cement and Concrete, Edward Arnold Ltd., London, 1956, pages 253, 446–448.

TOBIAS E. LEVOW, *Primary Examiner.*

S. E. MOTT, *Assistant Examiner.*